(12) United States Patent
Gozzini

(10) Patent No.: US 6,501,284 B1
(45) Date of Patent: Dec. 31, 2002

(54) CAPACITIVE FINGER DETECTION FOR FINGERPRINT SENSOR

(75) Inventor: Giovanni Gozzini, Berkeley, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 34 days.

(21) Appl. No.: 09/648,968

(22) Filed: Aug. 28, 2000

(51) Int. Cl.[7] ............................................... G01R 27/26
(52) U.S. Cl. ........................ 324/681; 324/662; 324/672; 324/688
(58) Field of Search ................... 324/681, 686, 324/661, 662, 658, 663, 667, 668, 672, 688

(56) References Cited

U.S. PATENT DOCUMENTS

| | | | | |
|---|---|---|---|---|
| 4,209,740 A | * | 6/1980 | Marthe et al. | 324/663 |
| 4,935,207 A | * | 6/1990 | Stanbro et al. | 422/68 |
| 5,673,041 A | * | 9/1997 | Chatigny et al. | 341/22 |
| 6,016,355 A | * | 1/2000 | Dickinson et al. | 324/678 |
| 6,114,862 A | * | 9/2000 | Tartagni et al. | 324/662 |

* cited by examiner

*Primary Examiner*—N. Le
*Assistant Examiner*—Anjan K. Deb
(74) *Attorney, Agent, or Firm*—Lisa K. Jorgenson; William A. Munck

(57) ABSTRACT

Within a capacitive fingerprint detection device, finger detection is provided by a capacitive grid overlying the fingerprint sensor electrodes to measure the absolute capacitance of the finger placed on the sensor surface. The capacitive measurement is converted to a representative frequency, which is then compared to a reference frequency or frequency range to determine whether the measured capacitance matches the expected bio-characteristics of living skin tissue. The finger detection thus provides anti-spoofing protection for the fingerprint detection device.

21 Claims, 3 Drawing Sheets

CAPACITIVE FINGER DETECTION FOR FINGERPRINT SENSOR

RELATED APPLICATIONS

The present invention is related to the subject matter of commonly assigned, copending U.S. patent application Ser. No. 09/649,808 entitled "RESISTIVE FINGER DETECTION FOR FINGERPRINT SENSOR" and filed Aug. 28, 2000. The content of the above-referenced application is incorporated herein by reference.

BACKGROUND OF THE INVENTION

1. Field of the Invention

The present invention relates to fingerprint detection and recognition and in particular to finger detection within integrated circuit devices employed for fingerprint-based identification and security mechanisms.

2. Description of the Related Art

Fingerprint detection and recognition has become a widely implemented identification and security (verification) measure for a variety of applications, including credit card usage, governmental licensing and registration, and premises access control. Integrated circuit fingerprint sensors used in such detection usually contain a two-dimensional array of sensing electrodes at a pitch substantially smaller than the size of the lines on the skin surface of a fingertip, allowing an image of the fingerprint pattern to be acquired for processing, analysis and comparison.

The structure of a typical electronic fingerprint sensor is depicted in FIG. 4. Fingerprint sensor 402 includes a planar array of sensing electrodes 404 conductively coupled to detection and image capture circuitry (not shown). Sensing electrodes 404 may be covered by a protective layer 406 against which the skin surface 408 of the fingertip is placed. Ridges 410 and valleys 412 formed by the lines on the fingertip skin surface 408 are then detected utilizing sensing electrodes 404.

Fingerprint detection is most commonly achieved at least partially through capacitive coupling with the finger. In such embodiments, skin surface 408 and sensing electrodes 404 each form a capacitor having a capacitance proportional to the distance between a respective sensing electrode 404 and the overlying skin surface 408. Thus, for example, the capacitance measured by sensor 402 at a point near the top of a fingerprint ridge 410 by a sensing electrode separated from skin surface 408 by a distance $d_{x,y}$ (where x and y denote the position of the respective sensing electrode within the two-dimensional sensor array) will differ from the capacitance measured through another sensing electrode at a point near the bottom of a fingerprint valley 412, where the intervening distance $d_{x,y+2}$ is greater. In this manner an electronic image of the fingerprint may be captured for further processing.

Fingerprint detection normally involves a relative or comparative process, in which a characteristic such as capacitance) at one sensing electrode within the array is processed relative to similar measurements by the other sensing electrodes. As a result, the fingerprint sensor is subject to attack by "spoofing," or presentation of the appropriate fingerprint pattern by an unauthorized individual. For example, the simplest spoofing technique might involve use of a finger severed from an authorized individual for that purpose.

It would be desirable, therefore, to protect against unauthorized uses of fingerprint patterns being employed in order to circumvent fingerprint-based identification and security mechanisms.

SUMMARY OF THE INVENTION

Within a capacitive fingerprint detection device, finger detection is provided by a capacitive grid overlying the fingerprint sensor electrodes to measure the absolute capacitance of the finger placed on the sensor surface. The capacitive measurement is converted to a representative frequency, which is then compared to a reference frequency or frequency range to determine whether the measured capacitance matches the expected bio-characteristics of living skin tissue. The finger detection thus provides anti-spoofing protection for the fingerprint detection device.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE INVENTION

The following description details the structure, application and features of the present invention, but it will be understood by those of skill in the art that the scope of the invention is defined only by the issued claims, and not by any description herein. The process steps and structures described below do not form a complete process flow for manufacturing integrated circuits. The present invention can be practiced in conjunction with integrated circuit fabrication techniques currently used in the art, and only so much of the commonly practiced process steps are included as are necessary for an understanding of the present invention. The figures representing cross-sections of portions of an integrated circuit during fabrication are not drawn to scale, but instead are drawn so as to illustrate the important features of the invention.

Figure 1:
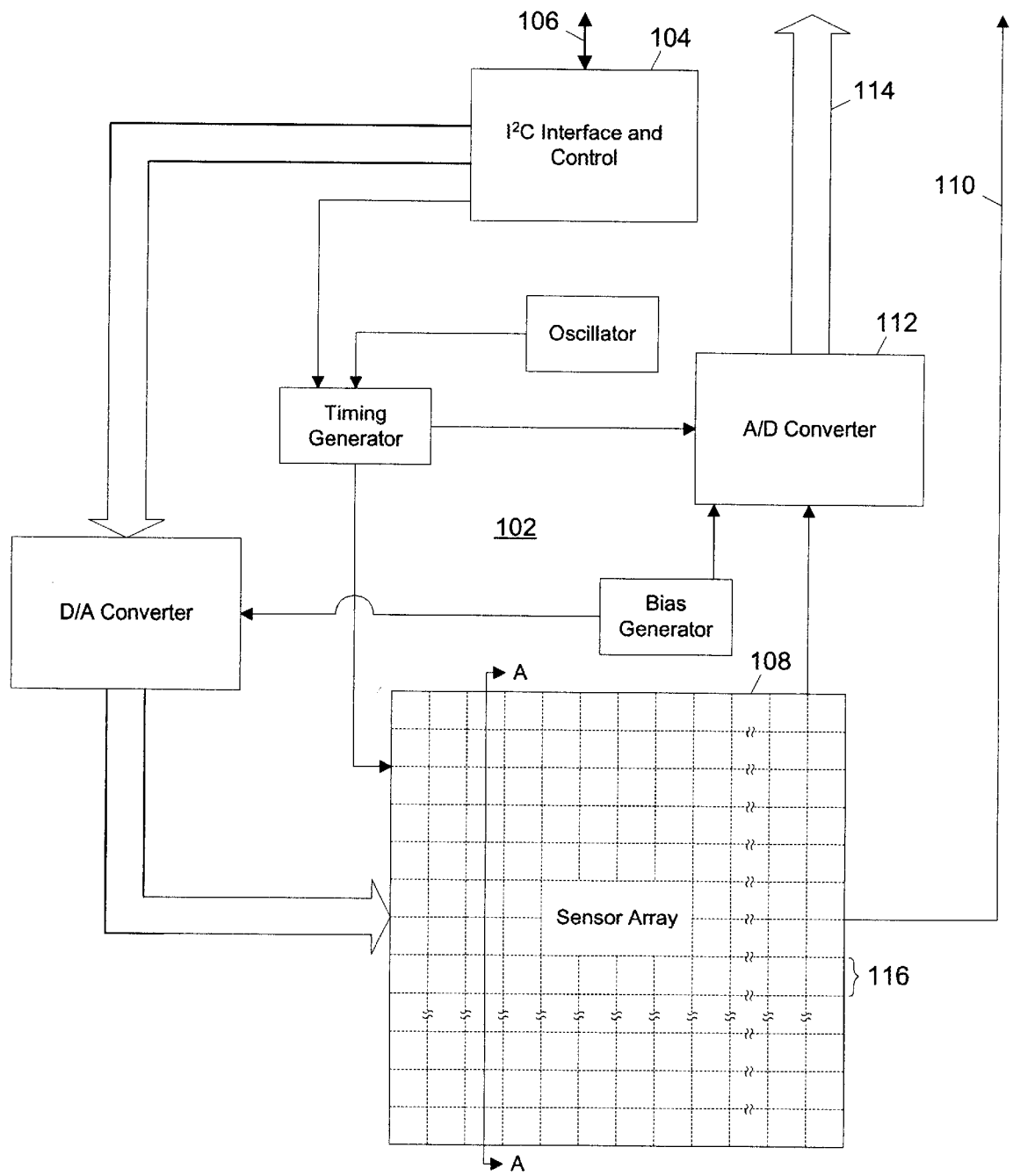
FIG. 1 depicts a fingerprint sensor circuit employing capacitive finger detection in accordance with a preferred embodiment of the present invention.

With reference now to the figures, and in particular with reference to FIG. 1, a fingerprint sensor circuit employing capacitive finger detection in accordance with a preferred embodiment of the present invention is depicted. FIG. 1 depicts a block diagram of the sensor circuit 102, which is formed as an integrated circuit on a single die. A suitable sensor circuit 102 and its operation are described more fully in commonly assigned, copending application Ser. No. 09/040,261, entitled "CAPACITIVE DISTANCE SENSOR" and filed May 9, 1998, which is incorporated herein by reference.

Sensor circuit 102 includes I²C interface and control device 104, which provides a bidirectional communication protocol enabling sensor circuit 102 to communicate with a controller, such as a microcontroller. I²C interface and control device 104 exchanges digital signals via control line 106 with controller circuitry (not shown) external to sensor circuit 102 in the example illustrated, although alternatively such control circuitry may also be integrated within sensor circuit 102. Sensor circuit 102 also includes an array 108 of capacitive sensors for fingerprint acquisition by sensing distances between capacitive electrodes within the sensor array 108 and ridges and grooves on a finger placed in contact with sensor array 108.

Sensor array 108 is coupled to the external controller circuit via synchronization line 110. Through synchronization line 110 sensor array 108 provides synchronization signals allowing detected voltages representative of the capacitive value of individual capacitive electrodes within sensor array 108, and therefore representative of the distance between the capacitive electrode and the portion of the epidermal layer contacting sensor array 108 in the region of the capacitive electrode, to be properly interpreted by the external controller. Sensor circuit 102 also includes an analog-to-digital (A/D) converter 112 processing analog voltage measurements received from sensor array 108 and generating digital representations recognized by the external controller as distance measurements of the analog-measured voltages from individual capacitive electrodes within sensor array 108. A/D converter 112 transmits these digital signals to the external controller on output bus 114.

Sensor array 108 includes a plurality of cells 116 each containing one or more capacitive electrodes. Sensor array 108 in the exemplary embodiment contains square cells approximately 45–50 µm on a side, forming a 250×350 array of contiguous cells 116 within sensor array 108. Sensor array 108 is covered by a passivation material overlying the capacitive electrodes within each cell 116. Other active devices required to form sensor circuit 102 are formed below the capacitive electrodes.

Figure 2A:
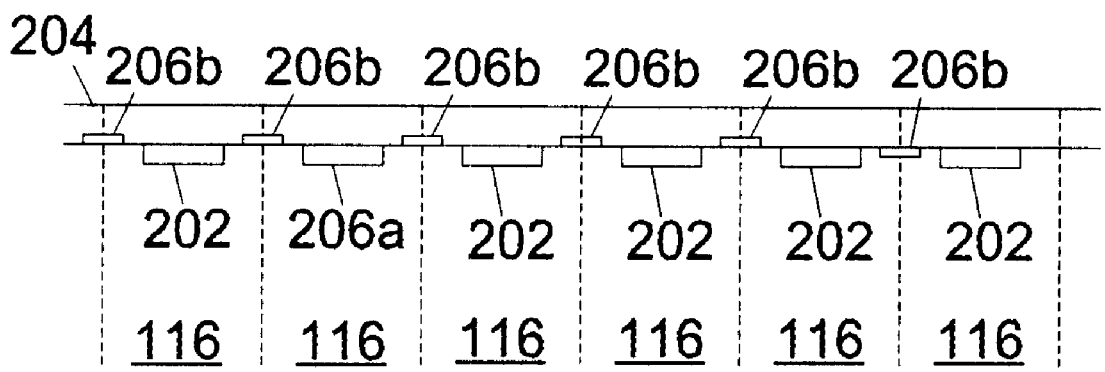
FIGS. 2A–2C are cross-sections of fingerprint sensor arrays including capacitive finger detection in accordance with a preferred embodiment of the present invention.
Figure 2B:
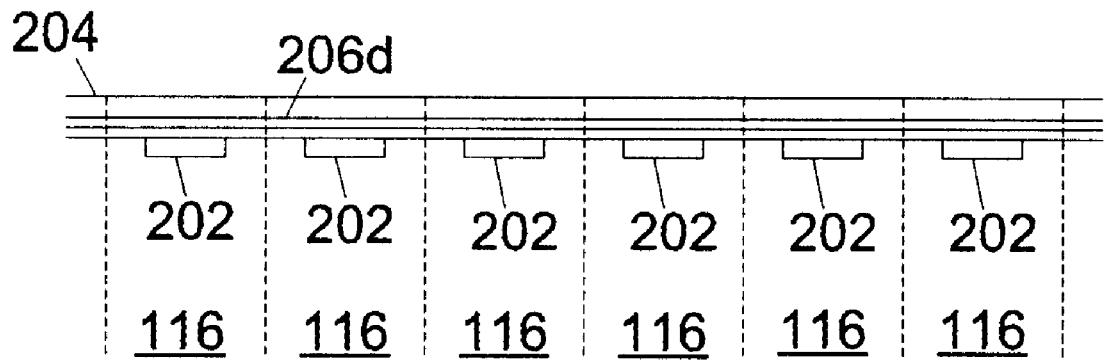
Figure 2C:
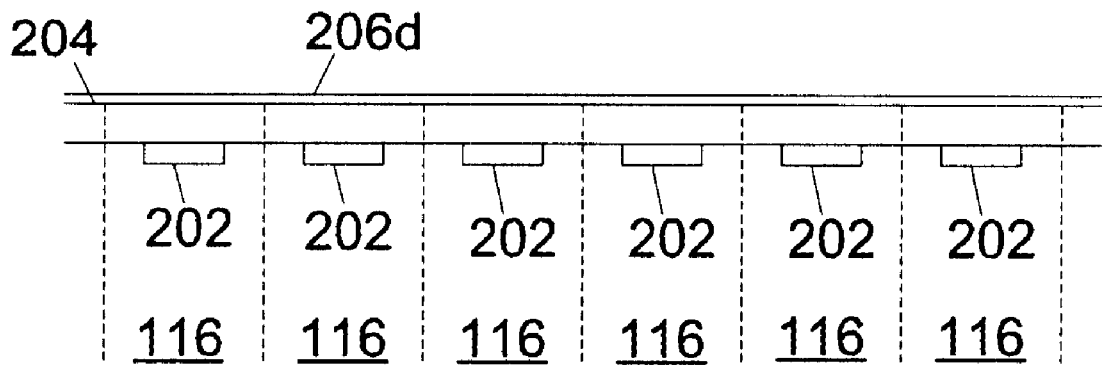

Referring to FIGS. 2A through 2C, cross-sections of sensor arrays including capacitive finger detection in accordance with a preferred embodiment of the present invention are illustrated. The cross-section depicted in FIGS. 2A and 2B are cross-sections of sensor array 108 taken at section line A—A depicted in FIG. 1. Cells 116 within sensor array 108 each include at least one capacitive fingerprint sensor electrode 202, which is employed to detect the fingerprint in accordance with the known art. A protective layer 204, which may be a combination of insulating and passivating layers, overlies the fingerprint sensor electrodes 202 and provides a surface on which the finger is placed.

In the present invention, sensor array 108 also includes an array of finger detection sensor electrodes 206a–206b and 206d. Finger detection sensor electrodes 206a–206b and 206d are employed to sense the overall capacitance of the finger when placed on the surface of the sensor array 108. This overall capacitance is then compared to a predefined "sample" or threshold value or range. If the capacitance of the finger is greater than the predefined value (or within the range), a finger is detected on the surface of sensor array 108.

Capacitive fingerprint sensor electrodes 202 could be utilized for measuring total capacitance of the finger as well as localized capacitance for detecting fingerprint lines. However, such a design would unnecessarily complicate calculation of capacitances. Instead, separate sensor electrodes 206a–206c, distinct from the capacitive fingerprint sensor electrodes 202 employed to detect the fingerprint, should preferably be employed for capacitive finger detection in accordance with the present invention. Finger detection sensor electrodes may replace the fingerprint detection sensor electrode within a particular cell, as illustrated by sensor electrode 206a, or may be situated between fingerprint detection sensor electrodes 202, as illustrated by sensor electrode 206b.

In a preferred embodiment, however, a separate, isolated capacitive grid 206b is formed over the fingerprint sensor detection electrodes 202. Grid lines for the capacitive sensor grid 206b may be formed within the protective layer 204 over spaces between fingerprint sensor detection electrodes 202 as shown in FIG. 2A. Alternatively, since relative capacitive measurements will not be skewed, a single capacitive plate 206d may be formed within the protective layer 204 as shown in FIG. 2B or above the protective layer 204 as shown in FIG. 2C, serving as the capacitive grid. Placement of the finger directly on capacitive plate 206d will still provide a capacitance for measurement and comparison.

Figure 3:
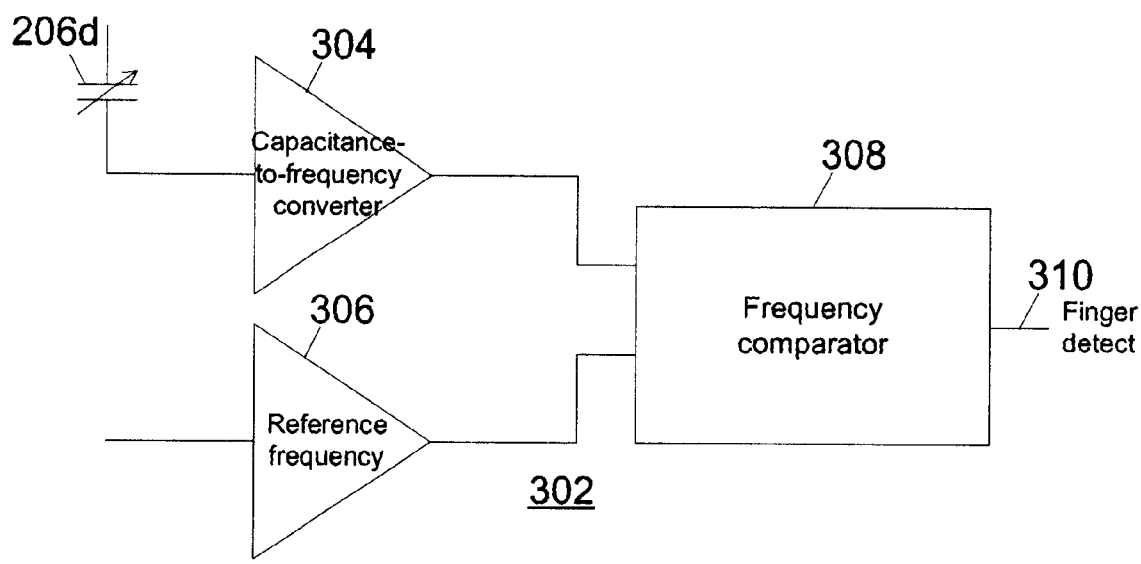
FIG. 3 depicts a circuit diagram for a finger detection circuit employed within a fingerprint sensor in accordance with a preferred embodiment of the present invention.
Figure 4:
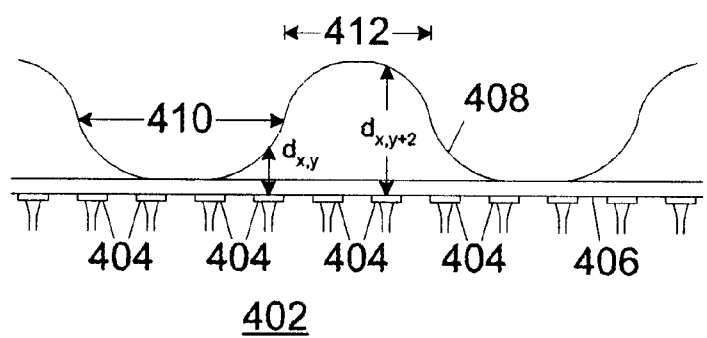
FIG. 4 is a diagram of a known capacitive fingerprint detection structure.

With reference now to FIG. 3, a circuit diagram for a finger detection circuit employed within a fingerprint sensor in accordance with a preferred embodiment of the present invention is depicted. Within finger detection circuit 302, finger detection sensor electrode(s) 206a or 206d, capacitive grid 206b or capacitive plate 206d (capacitive plate 206d in the example shown) are coupled to a capacitance-to-frequency converter 304.

As noted above, the absolute capacitance of a finger placed on the sensor device 102 is measured and utilized to detect a finger. This absolute capacitance will depend on the geometry of the contact area and on the bio-characteristics of the skin on the finger. The impact of differing contact geometries may be minimized by limited the size of the finger detection capacitive grid to an area which will normally be completely covered by the finger. The impact of the bio-characteristics of the finger for a living person, however, are employed to prevent spoofing by determining whether the finger placed on the fingerprint sensor device 102 provides a capacitance within a predefined range or above a predefined value.

The capacitance measurement is accomplished by connecting the variable capacitance representing the finger detection electrode 206d and the finger to a capacitance-to-frequency converter 304, which generates different frequencies depending upon the value of the capacitance measured. The frequency output of converter 304, which is a function of the capacitance being measured, is compared to at least one fixed-value reference frequency generated by a stable oscillator 306. The difference in frequencies is determined by a frequency comparator 308, which generates an output signal 310 indicated whether a finger has been detected.

Depending upon the processing and memory capabilities available, the measured capacitance (or representative frequency) may be compared to absolute thresholds or ranges for the entire populace, or to specific ranges for particular individuals identified by their fingerprint, with the individual ranges of authorized individuals being dynamically updated over time to accommodate aging and seasonal variations in the relevant bio-characteristics. In addition to providing anti-spoofing protection, fingerprint acquisition by the fingerprint sensor may also be concurrently triggered by the finger detection mechanism of the present invention.

The present invention employs measurement of bio-characteristics of skin, specifically absolute capacitance of a finger placed on a sensor for fingerprint detection, to provide anti-spoofing protection and real finger detection. Other bio-characteristics of living skin tissue may also be employed in conjunction with the present invention. The capacitive finger detection mechanism may be combined with the resistive finger detection mechanism described in the related application, either utilizing separate capacitive and resistive grids or utilizing a single grid for both capacitive and resistive measurements.

While the invention has been particularly shown and described with reference to a preferred embodiment, it will be understood by those skilled in the art that various changes in form and detail may be made therein without departing from the spirit and scope of the invention.

What is claimed is:

1. A method of finger detection, comprising:
   measuring a capacitance between a capacitive grid within a fingerprint detection device and a finger placed on a surface of the fingerprint detection device, wherein the capacitive grid is independent from capacitive sensor electrodes employed within the fingerprint detection device to detect fingerprint features;
   converting the measured capacitance to a corresponding, representative frequency; and
   comparing the frequency representing the measured capacitance to a frequency range corresponding to living skin tissue to determine whether a finger has been placed on the surface of the fingerprint detection device.

2. The method of claim 1, wherein the step of measuring a capacitance between a capacitive grid within a fingerprint detection device and a finger placed on a surface of the fingerprint detection device further comprises:
   measuring the capacitance at a capacitive grid replacing selected capacitive sensor electrodes or over the capacitive sensor electrodes.

3. The method of claim 1, wherein the step of measuring a capacitance between a capacitive grid within a fingerprint detection device and a finger placed on a surface of the fingerprint detection device further comprises:
   measuring the capacitance at a capacitive grid on the surface of the fingerprint detection device.

4. The method of claim 1, wherein the step of comparing the frequency representing the measured capacitance to a frequency range corresponding to living skin tissue to determine whether a finger has been placed on the surface of the fingerprint detection device further comprises:
   comparing the frequency representing the measured capacitance to a frequency range corresponding to capacitive bio-characteristics of living skin tissue.

5. The method of claim 1, wherein the step of comparing the frequency representing the measured capacitance to a frequency range corresponding to living skin tissue to determine whether a finger has been placed on the surface of the fingerprint detection device further comprises:
   comparing the frequency representing the measured capacitance to a threshold frequency; and
   determining that a finger has been placed on the surface of the fingerprint detection device if the frequency representing the measured capacitance exceeds the threshold frequency.

6. The method of claim 1, wherein the step of comparing the frequency representing the measured capacitance to a frequency range corresponding to living skin tissue to determine whether a finger has been placed on the surface of the fingerprint detection device further comprises:
   comparing the frequency representing the measured capacitance to a predefined frequency range; and
   determining that a finger has been placed on the surface of the fingerprint detection device if the frequency representing the measured capacitance falls within the predefined frequency range.

7. The method of claim 1, further comprising:
   generating a signal indicating whether a finger has been placed on the surface of the fingerprint detection device.

8. Anti-spoofing protection for a fingerprint detection device, comprising:
   a capacitive grid independent from capacitive sensor electrodes employed within the fingerprint detection device to detect fingerprint features;
   a capacitance-to-frequency converter detecting a capacitance between the capacitive grid and a finger on a surface of the fingerprint detection device and generating a corresponding, representative frequency; and
   a frequency comparator comparing the frequency representing the capacitance to a frequency range corresponding to capacitive bio-characteristics of living skin tissue to determine whether a finger has been placed on the surface of the fingerprint detection device.

9. The anti-spoofing protection of claim 8, wherein the capacitive grid replaces selected capacitive sensor electrodes.

10. The anti-spoofing protection of claim 8, wherein the capacitive grid is either between the capacitive sensor electrodes and the surface of the fingerprint detection device or on the surface of the fingerprint detection device.

11. The anti-spoofing protection of claim 8, further comprising:
    an oscillator generating at least one reference voltage employed by the frequency comparator to determine whether a finger has been placed on the surface of the fingerprint detection device.

12. The anti-spoofing protection of claim 11, wherein the oscillator generates a threshold frequency defining a minimum frequency corresponding to converted capacitive bio-characteristics of living skin tissue.

13. The anti-spoofing protection of claim 11, wherein the oscillator generates a pair of frequencies defining a frequency range corresponding to converted capacitive bio-characteristics of living skin tissue.

14. The anti-spoofing protection of claim 8, wherein the frequency comparator generates a signal indicating whether a finger has been placed on the surface of the fingerprint detection device.

15. A fingerprint detection device, comprising:
    capacitive sensor electrodes employed to detect fingerprint features;
    a capacitive grid independent of end between the capacitive sensor electrodes and a surface of the fingerprint detection device on which a finger is placed for detection of a fingerprint;
    a capacitance-to-frequency converter converting a capacitance between the capacitive grid and a finger on the surface of the fingerprint detection device into a corresponding, representative frequency; and
    a frequency comparator comparing the frequency representing the capacitance to a frequency range corresponding to capacitive bio-characteristics of living skin tissue to determine whether a finger has been placed on the surface of the fingerprint detection device.

16. The fingerprint detection device of claim 15, wherein the capacitive grid is either between selected capacitive sensor electrodes or between the capacitive sensor electrodes and the surface of the fingerprint detection device.

17. The fingerprint detection device of claim 15, wherein the capacitive grid is on the surface of the fingerprint detection device.

18. The fingerprint detection device of claim 15, further comprising:
   an oscillator generating at least one reference voltage employed by the frequency comparator to determine whether a finger has been placed on the surface of the fingerprint detection device.

19. The fingerprint detection device of claim 18, wherein the oscillator generates a threshold frequency defining a minimum frequency corresponding to converted capacitive bio-characteristics of living skin tissue.

20. The fingerprint detection device of claim 18, wherein the oscillator generates a pair of frequencies defining a frequency range corresponding to converted capacitive bio-characteristics of living skin tissue.

21. The fingerprint detection device of claim 15, wherein the frequency comparator generates a signal indicating whether a finger has been placed on the surface of the fingerprint detection device.

* * * * *